Oct. 12, 1954   E. F. KATZENBERGER   2,691,496
AIRCRAFT LANDING GEAR

Filed May 12, 1950   2 Sheets-Sheet 1

INVENTOR
EDWARD F. KATZENBERGER
BY
ATTORNEY

Oct. 12, 1954  E. F. KATZENBERGER  2,691,496
AIRCRAFT LANDING GEAR
Filed May 12, 1950  2 Sheets-Sheet 2
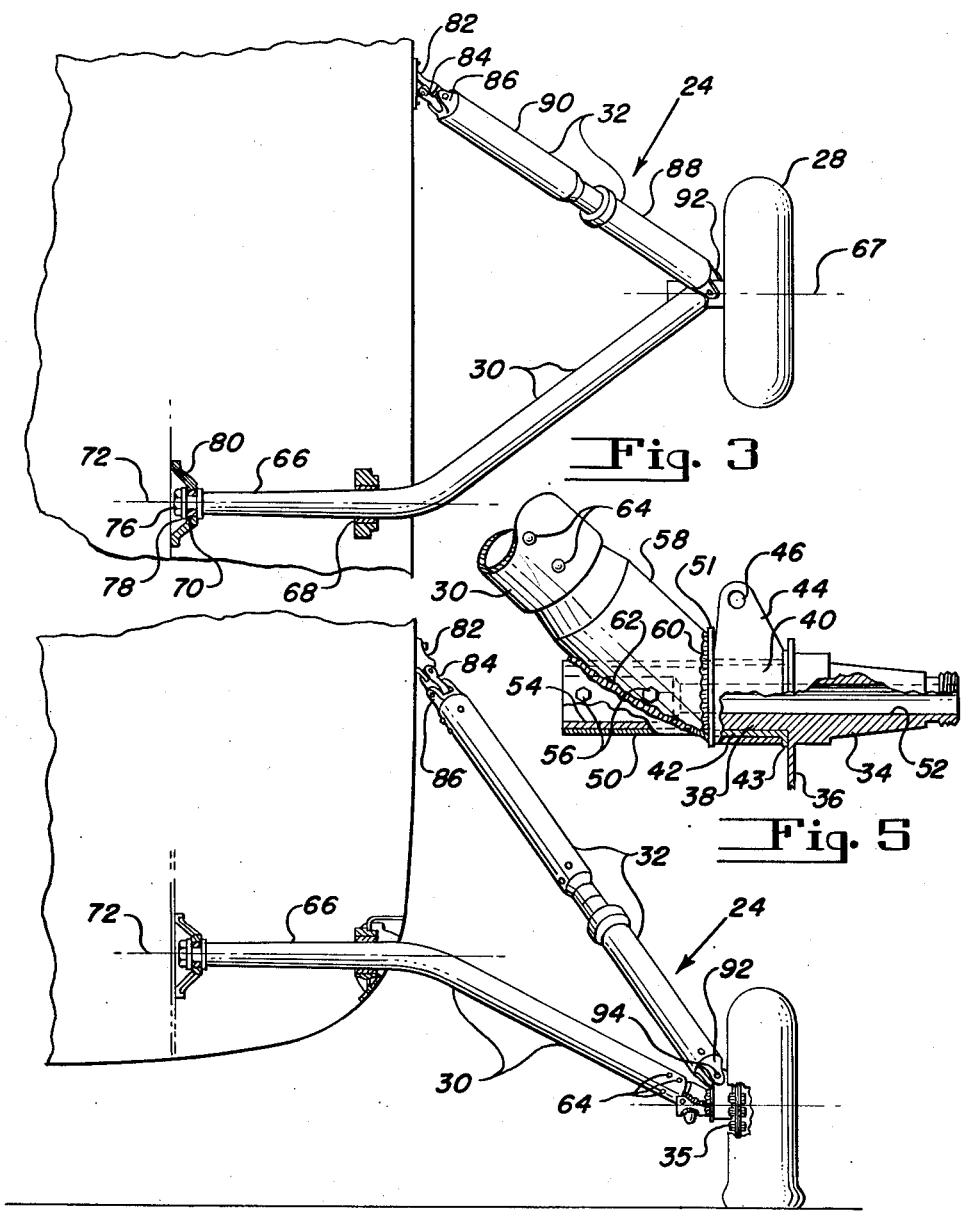
INVENTOR
EDWARD F. KATZENBERGER
BY *M. B. O'Tasker*
ATTORNEY Patented Oct. 12, 1954

2,691,496

UNITED STATES PATENT OFFICE 2,691,496

AIRCRAFT LANDING GEAR

Edward F. Katzenberger, Bridgeport, Conn., assignor to United Aircraft Corporation, East Hartford, Conn., a corporation of Delaware Application May 12, 1950, Serial No. 161,630

1 Claim. (Cl. 244—103)

This invention relates to rotary wing aircraft and particularly to an improved landing gear for such aircraft.

It is an object of this invention to provide a simple and relatively light weight landing gear particularly adapted to direct lift aircraft.

A further object of this invention is to provide such an improved landing gear in which the vertical loads are transmitted directly from the ground engaging member of the landing gear into the landing gear oleo strut.

A further object of this invention is to provide a light weight, simple landing gear structure in which the ground engaging member upon engagement moves in a vertical plane.

A still further object of the invention is to provide an improved three-member landing gear structure comprising a ground engaging member, a pivotal member, and an oleo strut, whereby the minimum drag would be combined with maximum strength and the lowest possible weight.

These and other objects and advantages of the invention will be apparent or will be subsequently pointed out in connection with the description of a preferred embodiment of the invention shown in the accompanying drawings.

In these drawings,

Fig. 3 is a plan view of Fig. 2.

Fig. 4 is a front view of Fig. 2, and

Fig. 5 is an enlarged detail partly in section in the vicinity of the wheel axle.

Figure 1:
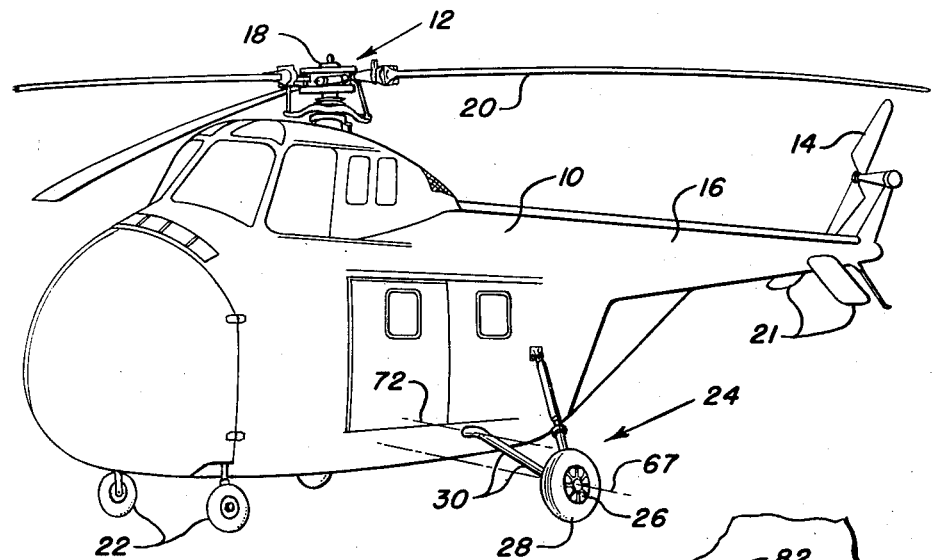
Fig. 1 is a side view of a helicopter equipped with the improved landing gear of this invention.

As shown in Fig. 1, a helicopter has a fuselage 10 which supports a main sustaining rotor 12 and an anti-torque tail rotor 14 mounted for rotation about a general horizontal axis at the extremity of a tail cone 16. The main rotor includes a hub structure 18 on which are articulated a plurality of rotor blades 20, herein three, which are adapted to be driven by an engine (not shown) mounted in the fuselage of the helicopter. The tail rotor 14 is driven from the same engine and at a suitable speed to counteract the torque of the main rotor. An inverted V-tail 21 is provided on the tail cone 16 for stabilizing purposes. This forms no part of the present invention, but is disclosed and claimed in a copending application Serial No. 199,626, filed Dec. 7, 1950, now Patent No. 2,630,985.

The helicopter is supported on the ground by a pair of castoring nose wheels 22 located at the forward part of the fuselage and by a pair of main landing gear 24, one of which is located on either side of the fuselage at a point aft of the center of gravity location of the ship. It is with the landing gear 24 that this invention is particularly concerned.

The two landing gear 24 are identical except for their right and left hand relationship and accordingly only the landing gear on the port side of the ship has been shown and will be described in detail.

Each landing gear 24 comprises essentially three major elements, a ground engaging member including a wheel 26 carrying a usual pneumatic tire 28, a pivotal member 30 and an oleo strut member 32. The wheel 26 is mounted on a non-rotatable axle 34 (Fig. 5) on which it is mounted for rotation on antifriction bearings in the usual manner. The wheel axle 34 carries a flange 36 just inboard of the wheel to which a brake unit (not shown) is attached by bolts 35 (Fig. 4). Immediately inboard of flange 36 axle 34 is provided with a reduced diameter portion 38 on which a collar 40 is rotatably mounted, a suitable flanged bearing sleeve 42 being provided between the axle and the collar. The flange 43 of this sleeve constitutes a thrust bearing for the outboard end of collar 40. The collar 40 is also provided with an integral upstanding lug 44 having an aperture 46 at its extremity for the attachment of the lower end of the oleo strut member 32. Immediately inboard of the collar 40 the axle member 44 is provided with a flanged sleeve 50 the annular flange 51 of which serves to locate the collar 40. Axle 34 has an axial passage 52 therethrough which is somewhat enlarged to form a recess 54 at its inboard end. Bolts 56 located in recess 54 are provided to secure the sleeve 50 rigidly to axle member 34.

Figure 2:
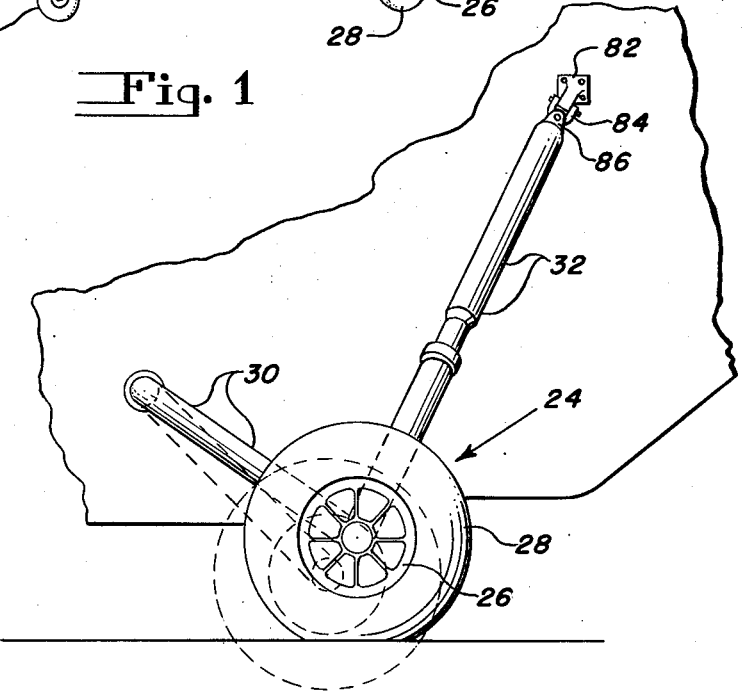
Fig. 2 is an enlarged detail of the landing gear of Fig. 1.

As shown most clearly in Fig. 5, an inclined tubular fitting 58 is welded at 60 to flange 51 and at 62 to sleeve 50. This fitting is received in the tubular outboard end of pivotal member 30 and is riveted permanently thereto by rivets 64. Member 30 has an intermediate oblique portion which extends generally forward from axle 34 and has an offset inboard end 66 which extends within the fuselage of the helicopter and is mounted in spaced bearings 68 and 70 carried by fixed structure of the helicopter. This off-set portion 66 is located forward of and parallel with the axis 67 of axle member 34. It will be noted from an inspection of Figs. 3 and 4 that the axis 72 of portion 66 is parallel with the axis 67 of axle 34. It will also be noted that the off-set portion 66 of member 30 tapers slightly toward its inboard end and terminates in a reduced diameter portion on which the bearing 70 is journalled. A nut 76 threaded onto the extremity of this reduced portion holds a washer 78 against the inboard side of supporting structure 80 for the bearing 70. It will be evident that upon rotation of member 30 about its supporting axis 72 the wheel 26 which lies in a vertical plane will move up and down while remaining in its vertical plane as shown in dotted line position of Fig. 2. This avoids lateral scuffing of the tires during a landing or take-off and greatly increases their life. In the event that the horizontal relationship of axis 72 is departed from or if this axis is not at right angles to the longitudinal axis of the aircraft, the tire scuffing will not be eliminated but it will still not be a departure from other advantages of this invention.

This vertical movement of wheel 26 is controlled by the oleo strut member 32 which is connected to fixed structure of the helicopter frame at its inboard end by a fitting 82 to which the upper end of the oleo strut is connected by a universal joint having the right angularly related pivots 84 and 86. The oleo strut may be of a usual construction containing a body of hydraulic fluid in a cylinder 88 which acts on the piston of a piston member 90 and controls the movement of the latter to shorten the strut upon ground engagement of the wheel 26. If desired the oleo strut may be of the oleo-pneumatic type. The particular construction of the oleo strut forms no part of the present invention. At its lower end the cylinder member 88 of the oleo strut is provided with clevis 92 which is designed to receive the upstanding lug 44 between its clevis arms, a bolt 94 being provided which extends through apertures in the clevis and the aperture 46 to provide a pivotal connection between the oleo member and the collar 40. Here it will be noted that the pivotal connecting bolt 94 in conjunction with the collar 40 which is journalled for rotation on the axle 34 in effect provides a universal connection between the latter and the oleo member. When the wheel 26 engages the ground in landing, member 30 will rotate about its axis 72 under the control of the oleo strut member 32. The latter is connected to axle 34 well aft of the axis 72, as a result of the oblique at directed intermediate portion of the member 30 which supports axle 34 at its extremity. This relationship may also be reversed so that oleo strut 32 connects to axle 34 ahead of axis 72 if the external portion of member 30 is directed forwardly.

It will be evident that as a result of this invention a particularly simple and effective landing gear has been provided for aircraft and one which is especially advantageous for direct lift aircraft. Although the instant application shows the gear for a main gear use, it may also be used on a nose wheel installation when the wheels would be mounted in a casterable relationship to axle 34. It will further be evident that as a result of this invention an improved support for the ground engaging members of such aircraft has been provided by which these members move under the control of fluid struts always in parallel vertical planes, in an improved manner.

While only one embodiment of the invention has been described and illustrated herein it will be evident that various changes may be made in the construction and the arrangement of the parts without departing from the scope of the invention.

I claim:

In an aircraft having a fuselage, landing gear mounted on said fuselage including a ground engaging member located on each side of said fuselage in vertical planes spaced laterally outboard of said fuselage a substantial distance, means for supporting each of said members from said fuselage including only two members which with said fuselage form a triangle of force transmitting members, the first of said supporting members including a bearing portion extending within and journalled on said fuselage for movement about a substantially horizontal axis, an intermediate oblique portion extending downwardly outwardly and aft from said fuselage and an outboard axle portion substantially parallel with said horizontal axis, and the second of said supporting members comprising a yieldable strut having a pivotal connection at its lower end with said first supporting member adjacent the outboard end of the latter and extending laterally inwardly upwardly and aft toward said fuselage and having a universal connection at its upper end with the latter.

References Cited in the file of this patent

UNITED STATES PATENTS

| Number | Name | Date |
| --- | --- | --- |
| 1,559,912 | Rohrbach | Nov. 3, 1925 |
| 1,719,799 | Watter | July 2, 1929 |
| 1,943,783 | Bellanca | Jan. 16, 1934 |
| 2,443,615 | Gruss | June 22, 1948 |
| 2,550,023 | Wells | Apr. 24, 1951 |

FOREIGN PATENTS

| Number | Country | Date |
| --- | --- | --- |
| 242,599 | Great Britain | Mar. 25, 1926 |
| 308,409 | Germany | June 28, 1919 |
| 405,683 | France | Nov. 20, 1909 |
| 829,039 | France | Mar. 7, 1938 |